United States Patent

Cantatore

Patent Number: 4,578,454
Date of Patent: Mar. 25, 1986

[54] POLYAMINOAMIDES CONTAINING POLYALKYLPIPERIDINE RADICALS

[75] Inventor: Giuseppe Cantatore, Bitonto, Italy

[73] Assignee: Ciba-Geigy S.p.A., Origgio, Italy

[21] Appl. No.: 608,081

[22] Filed: May 8, 1984

[51] Int. Cl.[4] .......................................... C08G 69/14
[52] U.S. Cl. .................................. 528/327; 524/103; 528/341; 546/188; 546/190
[58] Field of Search ................ 528/327, 341; 546/188, 546/190; 524/103

[56] References Cited

U.S. PATENT DOCUMENTS 3,370,044  2/1968  Beaman .............................. 528/327
3,463,847  8/1969  Ueda et al. .......................... 528/327

*Primary Examiner*—Harold D. Anderson
*Attorney, Agent, or Firm*—Wenderoth, Lind & Ponack

[57] ABSTRACT

A novel class of polymeric compounds containing piperidine radicals of the formula

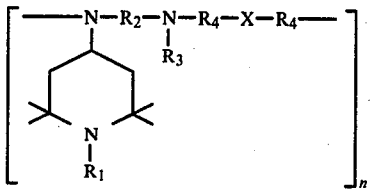

in which X is a divalent radical selected from the group comprising

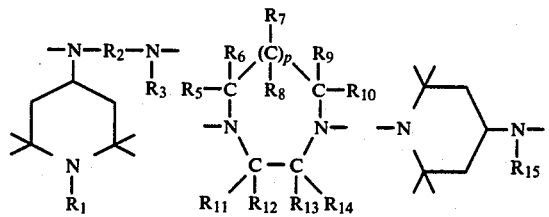

is described. The novel compounds are light stabilizers, heat stabilizers and oxidation stabilizers for synthetic polymers and are particularly effective in polyolefine films, fibres and tapes.

3 Claims, No Drawings

POLYAMINOAMIDES CONTAINING POLYALKYLPIPERIDINE RADICALS

The present invention relates to a novel class of polymeric compounds containing piperidine radicals, to the process for their preparation and to their use as stabilisers for synthetic polymers. It is known that synthetic polymers undergo a progressive change in their physical properties, such as loss of their mechanical strength and colour changes, when they are exposed to sunlight or other sources of ultraviolet light.

Since the destructive action of sunlight starts in the superficial layers, it is clear that the rate of such degradation is the greater, the greater the specific surface area of the polymer; therefore, manufactured articles with extensive surface development, such as fibres, tapes and films, more readily suffer photo-oxidative degradation. In order to delay the negative effect of ultraviolet radiation on synthetic polymers, it has been proposed to use various stabilisers which protect against light; in particular, for the light stabilisation of articles of small thickness, such as fibres, tapes and films, it has been proposed to use products of polymeric nature, which contain polyalkylpiperidine radicals and which, because of their relatively high molecular weight, are markedly resistant to volatilisation and to extraction by water. Some of these products also show a marked efficacy as light stabilisers; in particular, U.S. Pat. No. 4,086,204 has claimed polytriazine compounds comprising, for example, the compound of the formula

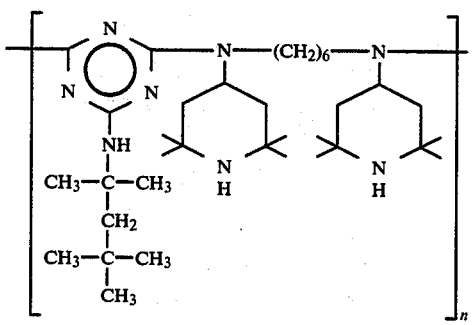

U.S. Pat. No. 4,104,248 has claimed, as stabilisers for polyolefins, polyamines comprising, for example, the compound of the formula

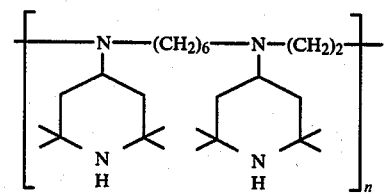

and U.S. Pat. No. 4,232,131 has claimed, likewise as stabilisers for polymers, polyamides comprising, for example, the compound of the formula

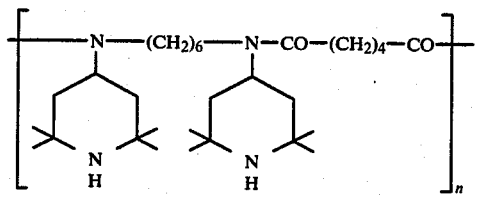

The results obtained with the abovementioned products were, however, not entirely satisfactory, so that a further improvement was desirable. The present invention relates to novel products of a polymeric nature, which contain piperidine radicals and have shown a surprising and unforeseeable higher activity as light stabilisers for synthetic polymers, as compared with products of the state of the art. The activity of the novel stabilisers is of particular interest for polyolefine films, fibres and tapes.

In particular, the present invention relates to novel polyaminoamides of the general formula (I)

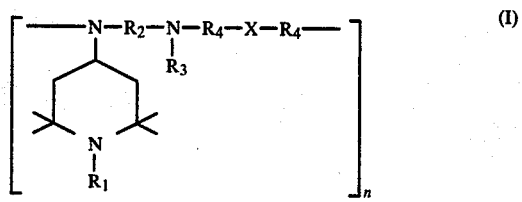

in which $R_1$ is hydrogen, O., $CH_2CN$, $C_1$–$C_{12}$-alkyl, $C_3$–$C_{12}$-alkenyl or -alkynyl, substituted or unsubstituted $C_7$–$C_{12}$-aralkyl or $C_1$–$C_{12}$-acyl, $R_2$ is $C_2$–$C_{18}$-alkylene, $C_5$–$C_{18}$-cycloalkylene, $C_6$–$C_{18}$-arylene or $C_7$–$C_{18}$-aralkylene, $R_3$ is hydrogen, $C_1$–$C_{18}$-alkyl, $C_5$–$C_{18}$-cycloalkyl, substituted or unsubstituted $C_6$–$C_{18}$-aryl, substituted or unsubstituted $C_7$–$C_{18}$-aralkyl or a radical of the formula (II)

in which $R_1$ is as defined above, the $R_4$'s are

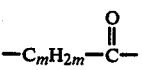

radicals with the carbonyl group attached either to X or to N and in which m is an integer from 1 to 12, X is a divalent radical containing 1 or more heterocyclic radicals of the formula (III), (IV) or (V)

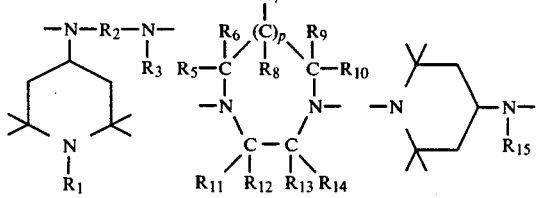

(III)      (IV)      (V)

in which $R_1$, $R_2$ and $R_3$ are as defined above, p is zero or 1, $R_5$, $R_6$, $R_7$, $R_8$, $R_9$, $R_{10}$, $R_{11}$, $R_{12}$, $R_{13}$ and $R_{14}$ are hydrogen or methyl, $R_{15}$ is hydrogen, $C_1$-$C_{18}$-alkyl, $C_5$-$C_{18}$-cycloalkyl, substituted or unsubstituted $C_6$-$C_{18}$-aryl, substituted or unsubstituted $C_7$-$C_{18}$-aralkyl or a radical of the formula (II), and n is an integer from 2 to 100.

In the present application

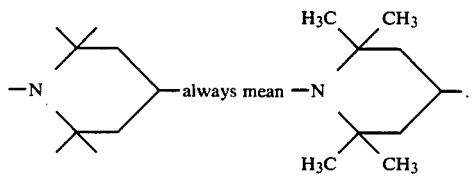

Substituted aryl or aralkyl means aryl or aralkyl which is substituted by hydroxy or/and by one or more $C_1$-$C_4$-alkyl groups.

Illustrative examples of the meanings of the various radicals are:

for $R_1$ hydrogen, cyanomethyl, methyl, ethyl, propyl, n-butyl, sec.butyl, tert.butyl, hexyl, octyl, 1,1,3,3-tetramethylbutyl, decyl, dodecyl, allyl, methallyl, but-2-enyl, hex-2-enyl, undec-10-enyl, propargyl, benzyl, 4-methylbenzyl, 4-t-butylbenzyl, 4-hydroxybenzyl, acetyl, propionyl, butyryl, caproyl and benzoyl;

for $R_2$ ethylene, 1,2- or 1,3-propylene, tetramethylene, hexamethylene, decamethylene, dodecamethylene, cyclohexylene, cyclohexylenedimethylene, o-, m- and p-phenylene and o-, m- and p-xylylene;

for $R_3$ hydrogen, methyl, ethyl, propyl, isopropyl, n-butyl, sec.butyl, tert.butyl, isobutyl, hexyl, 2-ethylhexyl, octyl, 1,1,3,3-tetramethylbutyl, decyl, dodecyl, octadecyl, cyclohexyl, 2- or 4-methylcyclohexyl, 3,3,5-trimethylcyclohexyl, cyclooctyl, cyclododecyl, phenyl, o-, m- and p-methylphenyl, 2,6-dimethylphenyl, 2,4,6-trimethylphenyl, 4-t-butylphenyl, 4-t-octylphenyl, 4-methoxyphenyl, 4-ethoxyphenyl, 3,5-di-t-butyl-4-hydroxyphenyl, benzyl, 4-methylbenzyl, 4-hydroxybenzyl, 3,5-di-t-butyl-4-hydroxybenzyl, 2,2,6,6-tetramethyl-piperidin-4-yl, 1,2,2,6,6-pentamethyl-piperidin-4-yl, 1-allyl-2,2,6,6-tetramethyl-piperidin-4-yl, 1-benzyl-2,2,6,6-tetramethyl-piperidin-4-yl and 1-acetyl-2,2,6,6-tetramethyl-piperidin-4-yl;

for $R_{15}$ hydrogen, methyl, ethyl, propyl, isopropyl, butyl, sec.butyl, tert.butyl, isobutyl, hexyl, 2-ethylhexyl, octyl, 1,1,3,3-tetramethylbutyl, decyl, dodecyl, hexadecyl, octadecyl, cyclohexyl, 2- or 4-methylcyclohexyl, 3,3,5-trimethylcyclohexyl, cyclooctyl, cyclododecyl, phenyl, o-, m- and p-methylphenyl, 2,6-dimethylphenyl, 2,4,6-trimethylphenyl, 4-t-butylphenyl, 4-t-octylphenyl, 4-methoxyphenyl, 4-ethoxyphenyl, 3,5-di-t-butyl-4-hydroxyphenyl, benzyl, 4-methylbenzyl, 4-hydroxybenzyl, 3,5-di-t-butyl-4-hydroxybenzyl, 2,2,6,6-tetramethyl-piperidin-4-yl, 1,2,2,6,6-pentamethyl-piperidin-4-yl, 1-allyl-2,2,6,6-tetramethyl-piperidin-4-yl, 1-benzyl-2,2,6,6-tetramethyl-piperidin-4-yl and 1-acetyl-2,2,6,6-tetramethyl-piperidin-4-yl.

Those compounds of the formula (I) are preferred in which $R_1$ is hydrogen, $C_1$-$C_6$-alkyl, $C_3$-$C_6$-alkenyl or -alkynyl, benzyl or $C_1$-$C_6$-acyl, $R_2$ is $C_2$-$C_{12}$-alkylene, $C_6$-$C_{10}$-cycloalkylene or $C_8$-$C_{10}$-aralkylene, $R_3$ is $C_1$-$C_{12}$-alkyl, $C_6$-$C_{10}$-cycloalkyl or a radical of the formula (II) in which $R_1$ is hydrogen, methyl, allyl, benzyl or acetyl, $R_{15}$ is hydrogen, $C_1$-$C_{12}$-alkyl, $C_6$-$C_{10}$-cycloalkyl, benzyl or a radical of the formula (II) in which $R_1$ is hydrogen, methyl, allyl, benzyl or acetyl, m is a number from 1 to 5 and n is a number from 2 to 50.

Those compounds of the formula (I) are particularly preferred in which $R_1$ is hydrogen or methyl, $R_2$ is $C_2$-$C_6$-alkylene, $R_3$ is $C_1$-$C_4$-alkyl, cyclohexyl, 2,2,6,6-tetramethyl-piperidin-4-yl or 1,2,2,6,6-pentamethyl-piperidin-4-yl, $R_7$, $R_8$, $R_{11}$, $R_{12}$, $R_{13}$ and $R_{14}$ are hydrogen, $R_{15}$ is hydrogen or $C_1$-$C_4$-alkyl, m is 1 or 2 and n is a number from 2 to 20.

The compounds of the formula (I) can be prepared by reacting a bis-halogenoamide of the formula (VI)

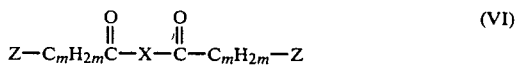

in which Z is chlorine or bromine, and X and m are as defined above, with a diamine of the formula (VII)

in which X is as defined above, with the proviso that X is

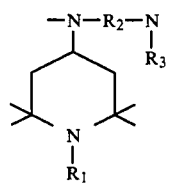

in at least one of the intermediates (VI) and (VII). The reaction is carried out in an inert organic solvent and in the presence of an organic or inorganic base at a temperature between 50° and 200° C., preferably between 80° and 180° C., in a molar ratio (VII):(VI) between 1.5:1 and 1:1.5, preferably between 1.2:1 and 1:1.

Organic solvents which can be used as the reaction medium are, for example, benzene, toluene, xylene, ethylbenzene, trimethylbenzene, tetralin, decalin, methanol, ethanol, isopropanol, n-butanol, butan-2-ol, isobutanol, n-pentanol, isopentanol, t-pentanol, n-hexanol, 4-methyl-pentan-2-ol, 2-methoxyethanol, 2-ethoxyethanol, 2-butoxyethanol, tetrahydrofuran, dioxane, dibutyl ether, 1,2-dimethoxyethane, 1,2-diethoxyethane, diethylene glycol dimethyl ether, diethylene glycol diethyl ether, N,N-dimethylformamide, N,N-dimethylacetamide, N-methylpyrrolidone and dimethylsulfoxide.

In order to fix the hydrochloric acid liberated in the process, the reaction is carried out in the presence of organic or inorganic bases, for example pyridine, triethylamine, tributylamine, sodium hydroxide, potassium hydroxide, sodium carbonate or potassium carbonate, the base being employed in every case in a quantity at least equivalent to the hydrochloric acid liberated in the reaction. The bis-halogenoamides of the formula (VI), which are the starting materials for the preparation of the compounds of the formula (I), can be prepared by known processes, for example by reacting a halogenoa- The product obtained melts at 131° C.

Analysis for $C_{28}H_{52}Cl_2N_4O_2$: Calculated %: C 61.41; H 9.57; N 10.23; Cl 12.95 Found %: C 61.67; H 9.51; N 10.24; Cl 12.89

By an analogous procedure, the following bis-halogenoamides of the formula (VI), employed for the synthesis of the compounds of the formula (I), are prepared:

| Bis-halogenoamide | Solvent of crystallisation | Melting point (°C.) |
|---|---|---|
| 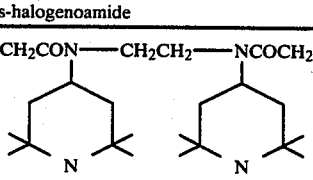 | 1,2-dichloro-ethane | 223–5 |
| 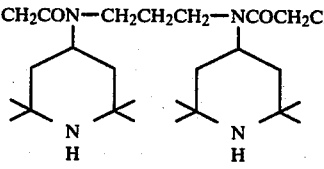 | acetone | 123 |
| 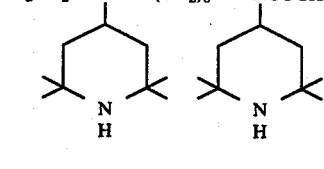 | isopropanol | 146 |
| 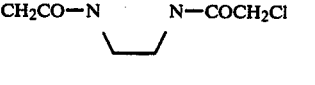 | ethanol | 137 |
| 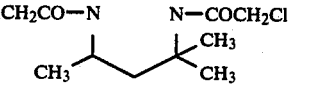 | acetone | 83–5 |
| 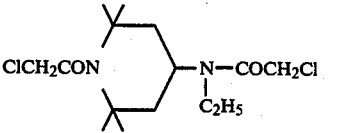 | acetone/hexane (1:2) | 79–80 | cyl halide with a diamine of the formula (VII).

As an illustrative example, the preparation of N,N'-bis-(chloroacetyl)-N,N'-bis-(2,2,6,6-tetramethyl-piperidin-4-yl)-1,6-diaminohexane is described below.

A solution of 118.6 g (1.05 mol) of chloroacetyl chloride in 100 ml of methylene chloride is added slowly to a solution of 197 g (0.5 mol) of N,N'-bis-(2,2,6,6-tetramethyl-piperidin-4-yl)-1,6-diaminohexane in 1000 ml of methylene chloride cooled to −20° C., but taking care that the temperature does not exceed −10° C. The mixture is stirred for 1 hour, while the temperature is allowed to rise to 0° C., a solution of 44 g (1.1 mol) of sodium hydroxide in 180 ml of water is then added in the course of 1 hour, the mixture is stirred for 1 hour at ambient temperature, the aqueous phase is separated off and the organic phase is evaporated to dryness. The residue is crystallised from acetone.

In order to illustrate the present invention more clearly, several examples of the preparation of compounds of the formula (I) are described below; these examples are given by way of illustration and do not imply any restriction.

EXAMPLE 1

54.7 g (0.1 mol) of N,N'-bis-(chloroacetyl)-N,N'-bis-(2,2,6,6-tetramethyl-piperidin-4-yl)-1,6-diaminohexane, 33.8 g (0.1 mol) of N,N'-bis-(2,2,6,6-tetramethyl-piperidin-4-yl)-1,2-diaminoethane, 8.4 g of sodium hydroxide and 100 ml of xylene are heated under reflux for 12 hours, the water formed in the reaction being separated off azeotropically. After cooling to 80° C., the mixture is filtered in order to remove the inorganic products, and the filtrate is evaporated to dryness by first heating under ambient pressure up to 160° C. and then applying a vacuum down to 1 mm Hg, while maintaining the same temperature. This gives a light yellow resinous product which melts at 115°–123° C. and has a number average molecular weight $\overline{M}n$ of 4,400.

EXAMPLES 2–11

The procedure described in Example 1 is repeated for the preparation of other polyaminoamides of the general formula:

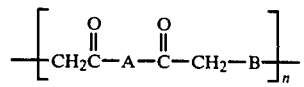

| Example No. | A | B | Melting point (°C.) | $\overline{M}n$ |
|---|---|---|---|---|
| 2 | —N—(CH₂)₆—N— (two tetramethylpiperidine rings, NH) | —N—(CH₂)₃—N— (two tetramethylpiperidine rings, NH) | 103–110 | 2500 |
| 3 | —N—(CH₂)₆—N— (two tetramethylpiperidine rings, NH) | —N—(CH₂)₆—N— (two tetramethylpiperidine rings, NH) | 95–106 | 4350 |
| 4 | —N—(CH₂)₆—N— (two tetramethylpiperidine rings, NH) | piperazine —N(⟩N— | 180–194 | 5600 |
| 5 | —N—(CH₂)₂—N— (two tetramethylpiperidine rings, NH) | —N—(CH₂)₃—N— (two tetramethylpiperidine rings, NH) | 130–138 | 2570 |
| 6 | —N—(CH₂)₃—N— (two tetramethylpiperidine rings, NH) | —N—(CH₂)₃—N— (two tetramethylpiperidine rings, NH) | 125–135 | 3930 |
| 7 | —N—(CH₂)₃—N— (two tetramethylpiperidine rings, NH) | —N—(CH₂)₆—N— (two tetramethylpiperidine rings, NH) | 102–107 | 2470 |
| 8 | piperazine —N(⟩N— | —N—(CH₂)₆—N— (two tetramethylpiperidine rings, NH) | 137–144 | 4180 |

-continued

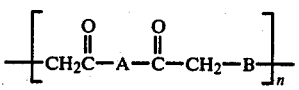

| Example No. | A | B | Melting point (°C.) | $\overline{M}n$ |
|---|---|---|---|---|
| 9 | piperazine | -N-(CH₂)₃-N- bis(2,2,6,6-tetramethylpiperidin-4-yl) | 95–104 | 2470 |
| 10 | 2,2,6,6-tetramethylpiperazine (with CH₃, CH₃, CH₃ substituents) | -N-(CH₂)₆-N- bis(2,2,6,6-tetramethylpiperidin-4-yl) | 80–87 | 2300 |
| 11 | -N-(CH₂)₂-N- bis(2,2,6,6-tetramethylpiperidin-4-yl) | -N-(CH₂)₃-N- (2,2,6,6-tetramethylpiperidin-4-yl)(cyclohexyl) | 140–150 | 3700 |

EXAMPLE 12

49.1 g (0.1 mol) of N,N'-bis-(chloroacetyl)-N,N'-bis-(2,2,6,6-tetramethyl-piperidin-4-yl)-1,2-diaminoethane, 39.4 g (0.1 mol) of N,N'-bis-(2,2,6,6-tetramethyl-piperidin-4-yl)-1,6-diaminohexane, 8.4 g of sodium hydroxide and 200 ml of 2-ethoxyethanol are heated under reflux for 16 hours. After filtration in order to separate the inorganic products off, and removal of the solvent, a light yellow resinous solid is obtained which melts at 120°–129° C. and has a number average molecular weight of $\overline{M}n$ of 2,200.

EXAMPLE 13

33.7 g (0.1 mol) of 1-chloroacetyl-4-(N-ethyl-chloroacetamido)-2,2,6,6-tetramethylpiperidine, 39.4 g (0.1 mol) of N,N'-bis-(2,2,6,6-tetramethyl-piperidin-4-yl)-1,6-diaminohexane, 100 ml of N,N-dimethylformamide and 27.6 g (0.2 mol) of potassium carbonate are heated at 100° C. for 16 hours. After insoluble materials have been filtered off and the solvent has been evaporated, a resinous solid is obtained which melts at 80°–92° C. and has a number average molecular weight $\overline{M}n$ of 1,800.

EXAMPLE 14

54.7 g (0.1 mol) of N,N'-bis-(3-chloropropionyl)-N,N'-bis-(2,2,6,6-tetramethyl-piperidin-4-yl)-1,6-diaminohexane, 8.6 g (0.1 mol) of piperazine and 150 ml of methylisobutylcarbinol are heated under reflux for 4 hours. 8 g of sodium hydroxide are added and the mixture is heated under reflux for a further 6 hours. After the inorganic products have been separated off and the solvent has been removed, a light yellow solid is obtained which melts at 87°–95° C. and has a number average molecular weight $\overline{M}n$ of 2,000.

EXAMPLE 15

50 g of the compound of Example 3, 13.8 g of paraformaldehyde, 24 g of 88% formic acid and 100 ml of water are heated under reflux for 10 hours. After cooling, a solution of 18 g of sodium hydroxide in 200 ml of water is added, the mixture is stirred at ambient temperature for 1 hour and filtered in order to separate off the precipitate which is then washed with water and dried.

The product obtained melts at 92°–100° C. and has a number average molecular weight $\overline{M}n$ of 4,500.

As mentioned at the outset, the compounds of the formula (I) are very effective in improving the light stability, heat stability and oxidation stability of synthetic polymers, for example high-density and low-density polyethylene, polypropylene, ethylene/propylene copolymers, ethylene/vinyl acetate copolymers, polybutadiene, polyisoprene, polystyrene, butadiene/styrene copolymers, vinyl chloride/vinylidene chloride polymers and copolymers, polyoxymethylene, polyurethanes, saturated and unsaturated polyesters, polyamides, polycarbonates, polyacrylates, alkyd resins and epoxide resins.

The compounds of the formula (I) can be mixed with the synthetic polymers in various proportions depending on the nature of the polymer, the end use and the presence of other additives. In general, it is advantageous to employ from 0.01 to 5% by weight of the compounds of the formula (I), relative to the weight of the polymers, preferably from 0.05 to 1%.

The compounds of the formula (I) can be incorporated into the polymeric materials by various processes, such as dry blending in the form of powders, or wet mixing in the form of solutions or suspensions, or mixing in the form of a masterbatch; in these operations, the synthetic polymer can be employed in the form of powder, granules, a solution, a suspension or in the form of a latex.

The polymers stabilised with the products of the formula (I) can be used for the preparation of moulded articles, films, tapes, fibres, monofilaments, surface coatings and the like.

If desired, other additives, such as antioxidants, ultraviolet absorbers, nickel stabilisers, pigments, fillers, plasticisers, antistatic agents, flameproofing agents, lubricants, anti-corrosion agents and metal deactivators, can be added to the mixtures of the compounds of the formula (I) with the synthetic polymers.

Examples of additives which can be mixed with the compounds of the formula (I) are, in particular:

1. Antioxidants

1.1. Alkylated monophenols, for example, 2,6-di-tert.butyl-4-methylphenol
2-tert.butyl-4,6-dimethylphenol
2,6-di-tert.butyl-4-ethylphenol
2,6-di-tert.butyl-4-n-butylphenol
2,6-di-tert.butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert.butyl-4-methoxymethylphenol

1.2. Alkylated hydroquinones, for example, 2,6-di-tert.butyl-4-methoxyphenol
2,5-di-tert.butyl-hydroquinone
2,5-di-tert.amyl-hydroquinone
2,6-diphenyl-4-octadecyloxyphenol

1.3. Hydroxylated thiodiphenyl ethers, for example 2,2'-thio-bis-(6-tert.butyl-4-methylphenol)
2,2'-thio-bis-(4-octylphenol)
4,4'-thio-bis-(6-tert.butyl-3-methylphenol)
4,4'-thio-bis-(6-tert.butyl-2-methylphenol)

1.4. Alkyliden-bisphenols, for example, 2,2'-methylene-bis-(6-tert.butyl-4-methylphenol)
2,2'-methylene-bis-(6-tert.butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert.butylphenol)
2,2'-ethylidene-bis-(4,6-di-tert.butylphenol)
2,2'-ethylidene-bis-(6-tert.butyl-4-isobutylphenol)
4,4'-methylene-bis-(2,6-di-tert.butylphenol)
4,4'-methylene-bis-(6-tert.butyl-2-methylphenol)
1,1-bis-(5-tert.butyl-4-hydroxy-2-methylphenyl)-butane
2,6-di-(3-tert.butyl-5-methyl-2-hydroxybenzyl)-4-methylphenol
1,1,3-tris-(5-tert.butyl-4-hydroxy-2-methylphenyl)-butane
1,1-bis-(5-tert.butyl-4-hydroxy-2-methylphenyl)-3-n-dodecylmercaptobutane
ethylenglycol-bis-[3,3-bis-(3'-tert.butyl-4'-hydroxyphenyl)-butyrat]
di-(3-tert.butyl-4-hydroxy-5-methylphenyl)-dicyclopentadien
di-[2-(3'-tert.butyl-2'-hydroxy-5'-methyl-benzyl)-6-tert.butyl-4-methylphenyl]-terephthalate.

1.5. Benzylcompounds, for example, 1,3,5-tri-(3,5-di-tert.butyl-4-hydroxybenzyl)-2,4,6-trimethylbenzene-di-(3,5-di-tert.butyl-4-hydroxybenzyl)-sulfide
3,5-di-tert.butyl-4-hydroxybenzyl-mercapto-acetic acid-isooctyl ester
bis-(4-tert.butyl-3-hydroxy-2,6-dimethylbenzyl)dithiolterephthalate
1,3,5-tris-(3,5-di-tert.butyl-4-hydroxybenzyl)-isocyanurate
1,3,5-tris-(4-tert.butyl-3-hydroxy-2,6-dimethylbenzyl)-isocyanurate
3,5-di-tert.butyl-4-hydroxybenzyl-phosphoric acid-dioctadecyl ester
3,5-di-tert.butyl-4-hydroxybenzyl-phosphoric acid-monoethyl ester, calcium-salt

1.6. Acylaminophenols, for example, 4-hydroxy-lauric acid anilide
4-hydroxy-stearic acid anilide
2,4-bis-octylmercapto-6-(3,5-tert.butyl-4-hydroxyanilino)-s-triazine
octyl-N-(3,5-di-tert.butyl-4-hydroxyphenyl)-carbaminate

1.7. Esters of
β-(3,5-di-tert.butyl-4-hydroxyphenyl)-propionic acid with monohydric or polyhydric alcohols, for example,

| | |
|---|---|
| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.8. Ester of
β-(5-tert.butyl-4-hydroxy-3-methylphenyl)propionic acid with monohydric or polyhydric alcohols, for example,

| | |
|---|---|
| methanol | diethyleneglycol |
| octadecanol | triethyleneglycol |
| 1,6-hexanediol | pentaerytritol |
| neopentylglycol | tris-hydroxyethyl isocyanorate |
| thiodiethyleneglycol | di-hydroxyethyl oxalic acid diamide |

1.9. Amides of
β-(3,5-di-tert.butyl-4-hydroxyphenyl)-propionic acid for example, N,N'-di-(3,5-di-tert.butyl-4-hydroxyphenylpropionyl)-hexamethylendiamine
N,N'-di-(3,5-di-tert.butyl-4-hydroxyphenylpropionyl)-trimethylendiamine
N,N'-di-(3,5-di-tert.butyl-4-hydroxyphenylpropionyl)-hydrazine

2. UV absorbers and light stabilisers

2.1. 2-(2'-Hydroxyphenyl)-benztriazoles, for example, the

5'-methyl-, 3',5'-di-tert.butyl-, 5'-tert.butyl-, 5'-(1,1,3,3-tetramethylbutyl)-, 5-chloro-3',5'-di-tert.butyl-, 5-chloro-3'-tert.butyl-5'-methyl-, 3'-sec.butyl-5'-tert.butyl-, 4'-octoxy-, 3',5'-di-tert.amyl-, 3',5'-bis-(α,α-dimethylbenzyl)-derivative.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxyderivative.

2.3. Esters of optionally substituted benzoic acids for example, phenyl salicylate, 4-tert.butyl-phenylsalicilate, octylphenyl salicylate, dibenzoylresorcinol, bis-(4-tert.butylbenzoyl)-resorcinol, benzoylresorcinol,3,5-di-tert.-butyl-4-hydroxybenzoic acid 2,4-di-tert.butylphenyl ester and 3,5-di-tert.-butyl-4-hydroxybenzoic acid hexadecyl ester.

2.4. Acrylates, for example,

α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5 Nickel compounds, for example, nickel complexes of 2,2'-thio- bis-[4-(1,1,3,3-tetramethylbutyl)-phenol], such as the 1:1 or 1:2 complex, optionally with additional ligands such as n-butylamine, triethanolamine or N-cyclohexyl-di-ethanolamine, nickel dibutyldithiocarbamate, nickel salts of 4-hydroxy-3,5-di-tert.butylbenzylphosphonic acid monoalkyl esters, such as of the methyl, ethyl or butyl ester, nickel complexes of ketoximes such as of 2-hydroxy-4-methyl-phenyl undecyl ketonoxime, nickel complexes of 1-phenyl-4-lauroyl-5-hydroxy-pyrazol, optionally with additional ligands.

2.6. Sterically hindered amines, for example bis-(2,2,6,6-tetramethylpiperidyl)-sebacate bis-(1,2,2,6,6-pentamethylpiperidyl)-sebacate n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylendiamine and 4-tert.octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid, 1,1'(1,2-ethanediyl)-bis-(3,3,5,5-tetramethylpiperazinone).

2.7. Oxalic acid diamides, for example, 4,4'-di-octyloxy-oxanilide, 2,2'-di-octyloxy-5,5'-di-tert.butyl-oxanilide, 2,2'-di-dodecyloxy-5,5'-di-tert.butyl-oxanilide, 2-ethoxy-2'-ethyl-oxanilide, N,N'-bis- (3-dimethylaminopropyl)-oxalamide, 2-ethoxy-5-tert.butyl-2'-ethyloxanilide and its mixture with 2-ethoxy-2'-ethyl-5,4'-di-tert.butyloxanilide and mixtures of ortho-and para-methoxy- as well as of o- and p-ethoxy-disubstituted oxanilides.

3. Metal deactivators, for example,

N,N'-diphenyloxalic acid diamide, N-salicylal-N'-salicyloylhydrazine, N,N'-bis-salicyloyl- hydrazine, N,N'-bis-(3,5-di-tert.butyl-4-hydroxyphenylpropionyl)-hydrazine, 3-salicyloylamino-1,2,4-triazole, bis-benzyliden-oxalic acid dihydrazide.

4. Phosphites and phosphonites, for example, triphenyl phosphite, diphenylalkyl phosphites, phenyldialkyl phosphites, tri-(nonyl- phenyl) phosphite, trilauryl phosphite, trioctadecyl phosphite, di-stearylpentaerythrit diphosphite, tris-(2,4-di-tert,butylphenyl) phosphite, di-isodecylpentaerythrit diphosphite, di-(2,4-di-tert.- butylphenyl)pentaerythrit diphosphite, tristearyl-sorbite tri- phosphite, tetrakis-(2,4-di-tert.butylphenyl)-4,4'-biphenylylen diphosphonite.

5. Compounds which destroy peroxide, for example, esters of β-thio- dipropionic acid, for example the lauryl, stearyl, myristyl or tridecyl esters, mercapto-benzimidazole or the zinc salt of 2-mercaptobenzimidazole, zinc-dibutyl-dithiocarbamate, dioctadecyl- disulfide, pentaerythrit-tetrakis-(β-dodecylmercapto)-propionate.

6. Polyamide stabilisers, for example, copper salts in combination with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or inc pyrocatecholate.

8. Nucleating agents, for example, 4-tert.butyl-benzoic acid, adipic acid, diphenylacetic acid.

9. Fillers and reinforcing agents, for example, calcium carbonate, silicates, glass fibres, asbestos, talc, kaolin, mica, barium sulfate, metal oxides and hydroxydes, carbon black, graphite.

10. Other additives, for example, plasticisers, lubricants, emulsifiers, pigments, optical brighteners, flameproofing agents, antistatic agents and blowing agents.

The efficiency, as stabilisers, of the products prepared according to the present invention is illustrated in the examples which follow, in which the results obtained in the stabilisation of polypropylene tapes and fibres with several typical products of the series are reported.

EXAMPLE 16

2 g of each of the products indicated in Table 1, 1 g of pentaerythritol tetrakis-3-(3,5-di-t-butyl-4-hydroxyphenyl)-propionate and 1 g of calcium stearate are mixed, in a powder mixer, with 1,000 g of polypropylene powder of melt index 2.4 (Propathene HF 18, a product of Imperial Chemical Industries).

The mixtures obtained are extruded at a temperature of 180°–220° C., to give polymer granules, which are then converted into stretched tapes of 50 μm thickness and 2.5 mm width, under the following working conditions:

extruder temperature: 220°–240° C.
head temperature: 240° C.
stretch ratio: 1:6

The tapes thus prepared are exposed, mounted on a white card, in a Weather-Ometer 65 WR model (ASTM G 27-70), with a black panel temperature of 63° C.

The residual tenacity is measured on samples, taken after various times of exposure to light, by means of a constant-speed tensometer; the exposure time in hours ($T_{50}$) needed to halve the initial tenacity is then calculated.

For comparison, polypropylene tapes prepared under the same conditions as indicated above, but without the addition of the compounds of the invention, are exposed.

The results obtained are shown in Table 1:

TABLE 1

| Stabiliser | $T_{50}$ (hours) |
|---|---|
| none | 230 |
| Compound of Example 1 | 2,350 |
| Compound of Example 2 | 2,220 |
| Compound of Example 3 | 1,700 |
| Compound of Example 5 | 2,130 |
| Compound of Example 6 | 1,870 |
| Compound of Example 7 | 2,350 |
| Compound of Example 10 | 2,120 |
| Compound of Example 12 | 2,000 |

EXAMPLE 17

2.5 g of each of the products indicated in Table 2, 1 g of octadecyl 3-(3,5-di-t-butyl-4-hydroxyphenyl)-propionate, 1 g of calcium stearate and 2.5 g of titanium dioxide (KRONOS RN 57) are mixed, in a powder mixer, with 1,000 g of polypropylene powder of melt index 13 (Propathene HF 85, a product of Imperial Chemical Industries).

The mixtures are extruded at 180°-220° C., to give polymer granules which are then converted into fibres, under the following working conditions:
- extruder temperature: 220°-240° C.
- spinneret temperature: 240° C.
- stretch ratio: 1:3.5
- count: 20 deniers per fibre The fibres thus obtained are exposed, mounted on a white card, in a Weather-Ometer 65 WR model with a black panel temperature of 63° C. The $T_{50}$ value as described in the preceding example is then calculated.

For comparison, the data obtained with fibres prepared under the same conditions as described above, but without the addition of the compounds of the invention, are also given.

The results obtained are shown in Table 2:

TABLE 2

| Stabilisers | $T_{50}$ (hours) |
|---|---|
| none | 190 |
| Compound of Example 1 | 1,560 |
| Compound of Example 2 | 1,370 |
| Compound of Example 3 | 1,310 |
| Compound of Example 5 | 1,400 |
| Compound of Example 6 | 1,200 |
| Compound of Example 7 | 1,800 |
| Compound of Example 8 | 1,320 |
| Compound of Example 12 | 1,560 |

What is claimed is:

1. A compound of the general formula

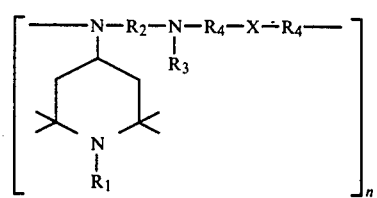

in which $R_1$ is hydrogen, O., $CH_2CN$, $C_1$-$C_{12}$-alkyl, $C_3$-$C_{12}$-alkenyl or -alkynyl, substituted or unsubstituted $C_7$-$C_{12}$-aralkyl or $C_1$-$C_{12}$-acyl, $R_2$ is $C_2$-$C_{18}$-alkylene, $C_5$-$C_{18}$-cycloalkylene, $C_6$-$C_{18}$-arylene or $C_7$-$C_{18}$-aralkylene, $R_3$ is hydrogen, $C_1$-$C_{18}$-alkyl, $C_5$-$C_{18}$-cycloalkyl, substituted or unsubstituted $C_6$-$C_{18}$-aryl, substituted or unsubstituted $C_7$-$C_{18}$-aralkyl or a radical of the formula (II)

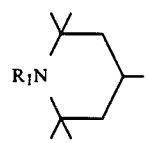

in which $R_1$ is as defined above, the $R_4$'s are

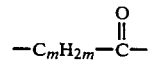

radicals wherein both carbonyl groups are attached either to X or to N and in which m is an integer from 1 to 12, X is a divalent radical containing 1 or more heterocyclic radicals of the formula (III), (IV) or (V)

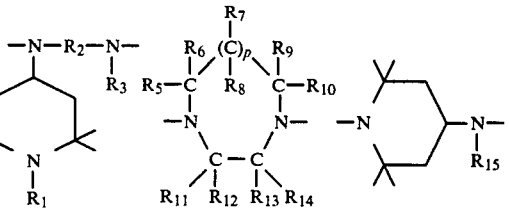

in which $R_1$, $R_2$ and $R_3$ are as defined above, p is zero or 1, $R_5$, $R_6$, $R_7$, $R_8$, $R_9$, $R_{10}$, $R_{11}$, $R_{12}$, $R_{13}$ and $R_{14}$ are hydrogen or methyl, $R_{15}$ is hydrogen, $C_1$-$C_{18}$-alkyl, $C_5$-$C_{18}$-cycloalkyl, substituted or unsubstituted $C_6$-$C_{18}$-aryl, substituted or unsubstituted $C_7$-$C_{18}$-aralkyl or a radical of the formula (II), and N is an interger from 2 to 100.

2. A compound of the formula (I), according to claim 1, in which $R_1$ is hydrogen, $C_1$-$C_6$-alkyl, $C_3$-$C_6$-alkenyl or -alkynyl, benzyl or $C_1$-$C_6$-acyl, $R_2$ is $C_2$-$C_{12}$-alkylene, $C_6$-$C_{10}$-cycloalkylene or $C_8$-$C_{10}$-aralkylene, $R_3$ is $C_1$-$C_{12}$-alkyl, $C_6$-$C_{10}$-cycloalkyl or a radical of the formula (II) in which $R_1$ is hydrogen, methyl, allyl, benzyl or acetyl, $R_{15}$ is hydrogen, $C_1$-$C_{12}$-alkyl, $C_6$-$C_{10}$-cycloalkyl, benzyl or a radical of the formula (II) in which $R_1$ is hydrogen, methyl, allyl, benzyl or acetyl, m is a number from 1 to 5 and n is a number from 2 to 50.

3. A compound of the formula (I), according to claim 1, in which $R_1$ is hydrogen or methyl, $R_2$ is $C_2$-$C_6$-alkylene, $R_3$ is $C_1$-$C_4$-alkyl, cyclohexyl, 2,2,6,6-tetramethyl-piperidin-4-yl or 1,2,2,6,6-pentamethyl-piperidin-4-yl, $R_7$, $R_8$, $R_{11}$, $R_{12}$, $R_{13}$ and $R_{14}$ are hydrogen, $R_{15}$ is hydrogen or $C_1$-$C_4$- alkyl, m is 1 or 2 and n is a number from 2 to 20.

* * * * *